US010908055B2

(12) United States Patent
Thambi

(10) Patent No.: US 10,908,055 B2
(45) Date of Patent: Feb. 2, 2021

(54) EVALUATION OF APPLICATIONS USING DIGITAL IMAGE CORRELATION TECHNIQUES

(71) Applicant: SABIC Global Technologies B.V., Bergen op Zoom (NL)

(72) Inventor: Joel Thambi, Bergen op Zoom (NL)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/300,206

(22) PCT Filed: May 11, 2017

(86) PCT No.: PCT/IB2017/052782
§ 371 (c)(1),
(2) Date: Nov. 9, 2018

(87) PCT Pub. No.: WO2017/195154
PCT Pub. Date: Nov. 16, 2017

(65) Prior Publication Data
US 2020/0209126 A1 Jul. 2, 2020

Related U.S. Application Data

(60) Provisional application No. 62/336,002, filed on May 13, 2016.

(51) Int. Cl.
*G01N 3/00* (2006.01)
*G01N 3/36* (2006.01)
*G01B 11/16* (2006.01)

(52) U.S. Cl.
CPC .............. *G01N 3/36* (2013.01); *G01B 11/16* (2013.01); *G01N 2203/0005* (2013.01);
(Continued)

(58) Field of Classification Search
CPC .. G01N 3/36; G01N 11/16; G01N 2203/0005; G01N 2203/0044;
(Continued)

(56) References Cited

U.S. PATENT DOCUMENTS 5,606,415 A * 2/1997 Doty .................... G01C 19/721
250/227.24
6,874,370 B1 * 4/2005 Vachon ..................... G01N 3/32
73/808

(Continued)

FOREIGN PATENT DOCUMENTS

CN 101014938 A 8/2007
CN 101558174 A 10/2009
(Continued)

OTHER PUBLICATIONS

Mao et al.; "Multiscale monitoring of interface failure of brittle coating/ductile substrate systems: A non-destructive evaluation method combined digital image correlation with acoustic emission"; Journal of Applied Physics; vol. 110; 2011; 21 pages.
(Continued)

Primary Examiner — Max N Noori
(74) Attorney, Agent, or Firm — BakerHostetler

(57) ABSTRACT

A method for material lifetime evaluation includes: causing a stress to be applied to a material surface of a component based at least on a cycle of load properties over time; causing an image of the material surface to be captured as a captured image of a complete in-situ field; determining an area of a hysteresis of a stable surface strain region in a stress-strain curve of the material surface to determine a loss energy (first damage parameter) for low cycle fatigue modeling; determining a deformation energy (second damage parameter) for high cycle fatigue monitoring; determining a failure parameter based on at least one of the first damage parameter and the second damage parameter; comparing the
(Continued)

failure parameter to a record in a database; and determining a remaining life of the component based on comparison of the failure parameter to the record in the database.

17 Claims, 13 Drawing Sheets

(52) U.S. Cl.
CPC ............. *G01N 2203/0044* (2013.01); *G01N 2203/0057* (2013.01); *G01N 2203/0073* (2013.01); *G01N 2203/0218* (2013.01); *G01N 2203/0647* (2013.01)

(58) Field of Classification Search
CPC ... G01N 2203/0057; G01N 2203/0073; G01N 2203/0218; G01N 2203/0647
USPC .......................................................... 73/800
See application file for complete search history.

(56) References Cited

U.S. PATENT DOCUMENTS

| | | | |
|---|---|---|---|
| 7,549,336 B2 | 6/2009 | Masyada | |
| 8,050,874 B2 | 11/2011 | Papadimitriou et al. | |
| 9,046,353 B2 | 6/2015 | Michopoulos et al. | |
| 9,760,765 B2* | 9/2017 | Shibutani | G06K 9/00288 |
| 2009/0116533 A1 | 5/2009 | O'Connell et al. | |
| 2010/0183191 A1 | 7/2010 | Wieneke | |
| 2011/0106459 A1* | 5/2011 | Christ, Jr. | G01N 21/892 702/42 |
| 2012/0062751 A1* | 3/2012 | Homma | G01N 25/72 348/163 |
| 2014/0160279 A1 | 6/2014 | Grossnickle et al. | |
| 2015/0035950 A1 | 2/2015 | Kontsos et al. | |
| 2015/0099990 A1* | 4/2015 | Liang | A61B 5/02007 600/508 |
| 2016/0270671 A1* | 9/2016 | Madabushi | A61B 5/0002 |

FOREIGN PATENT DOCUMENTS

| | | |
|---|---|---|
| CN | 101644646 A | 2/2010 |
| CN | 101776645 B | 5/2012 |
| CN | 102564856 A | 7/2012 |
| CN | 103743818 A | 4/2014 |
| CN | 104390860 A | 3/2015 |
| EP | 2489010 B1 | 12/2013 |
| WO | WO 2011/045351 A1 | 4/2011 |
| WO | WO 2013/158933 A1 | 10/2013 |

OTHER PUBLICATIONS

Peters et al.; "Digital Imaging Techniques in Experimental Stress Analysis"; Optical Engineering; vol. 21(3); 1982; p. 427-431.
International Patent Application No. PCT/IB2017/052782; Int'l Search Report and the Written Opinion; dated Aug. 30, 2017; 8 pages.
International Patent Application No. PCT/IB2017/052782; Int'l Preliminary Examining Authority; dated Apr. 17, 2018; 6 pages.
Tao et al.; "Mean stress/strain effect on fatigue behavior of an epoxy resin"; Int'l Journal of Fatigue; vol. 29; 2007; p. 2180-2190.
Tao et al.; "Ratcheting behavior of an epoxy polymer and its effect on fatigue life"; Polymer Testing; vol. 26; 2007; p. 451-460.
Tao et al.; "Biaxial fatigue behavior of an epoxy polymer with mean stress effect"; Int'l Journal of Fatigue; vol. 31; 2009; p. 678-685.
International Patent Application No. PCT/IB2017/052782; Int'l Preliminary Report on Patentability; dated Aug. 31, 2018; 22 pages.

* cited by examiner

EVALUATION OF APPLICATIONS USING DIGITAL IMAGE CORRELATION TECHNIQUES

CROSS-REFERENCE TO RELATED APPLICATION

This application is the National Stage of International Application No. PCT/IB2017/052782, filed May 11, 2017, which claims the benefit of U.S. Provisional Application No. 62/336,002 filed May 13, 2016, the disclosures of which are incorporated herein by this reference in their entireties.

FIELD OF DISCLOSURE

The present disclosure relates to evaluation of applications including material components. More specifically, the disclosure relates to processes and system configurations for evaluation of applications using digital image correlation techniques.

BACKGROUND

Lifetime evaluation methodologies are gaining more focus and importance, especially in applications of components subjected to fatigue, wear, erosion, etc. Applications, such as those including polymer components, may be subjected to harsh environments where lifetime of components can be significantly reduced. Current understanding of the fatigue failure and its consequent lifetime evaluations are typically based on empirical studies, due to the influence of multiple factors. For example, such empirical studies may include investigating various fatigue influential factors (e.g. stress, temperature, fiber orientations, stress ratio (R-ratio), frequency etc.), under fixed or iso-conditions. Standard methods of testing may include tensile fatigue, stress cycle (SN curve fatigue, and the like, for material characterization. However, the empirical study of such factors is not a cost effective approach, due to at least the large number of experiments required to investigate such fatigue behavior.

It is also difficult to translate these application-oriented solutions into widely applicable approach. To find universal acceleration techniques that fit different application is still a challenge due at least to the breadth of design complexity encountered. Current solutions often focus on generic levels of components (e.g., tensile bars, element level, etc.), leaving a research gap in fatigue evaluation/prediction on complex applications that include weld-line, fiber orientations, notches, etc.

These and other shortcomings of the prior art are addressed by the present disclosure.

SUMMARY OF THE DISCLOSURE

In an aspect, the present disclosure relates to system and methods for evaluating components (e.g., polymer article) using fatigue models based on surface strain energy density (SSED) failure criterion. The surface strain energy density values may be calculated based on an optical three dimensional (3D) full strain field measurement. As such, the SSED may be used to characterize the life of the physical part/component for various loading conditions. Critical surface region for strain energy density may be identified as hot spots for potential failure such as weld-line, higher stress gradient regions, notches, etc. However, measuring strain for a critical surface region is difficult with traditional approaches (as failure location is sometimes unknown). The systems and methods of the present disclosure may comprise calculating SSED over critical surface using digital image correlation (DIC) techniques. In other words, components can be evaluated by quantifying the amount of surface energy dissipated or accumulated by the material, over specific interval the component, subjected to load.

BRIEF DESCRIPTION OF THE FIGURES

The accompanying figures, which are incorporated in and constitute a part of this specification, illustrate several aspects and together with the description serve to explain the principles of the disclosure.

FIGS. 8A-8B each show a strain contour plot for a fatigue evaluation region, wherein FIG. 8A illustrates a sample gated from the top of the region without a weldline and FIG. 8B illustrates a sample gated from the side of the region with a weldline.

FIGS. 13A-B each show a surface strain energy density vs. lifetime plot, accompanying different temperature, R-ratio, pressure levels, fiber-orientation, wherein FIG. 13A is based on single power law and FIG. 13B is based on double power law.

DETAILED DESCRIPTION

The systems and method of the present disclosure relate to evaluation of component parts using surface strain energy density (SSED) failure criterion and a customized experimental setup. As an example, the SSED values may be calculated based on an optical 3D full strain field measurement using stereographic digital image correlation (DIC) systems. The SSED values may be considered as damage parameters (DP) and may be used to characterize the life of the component part or overall application independent of the various loading conditions that may be applied.

It is to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

Systems

Figure 1:
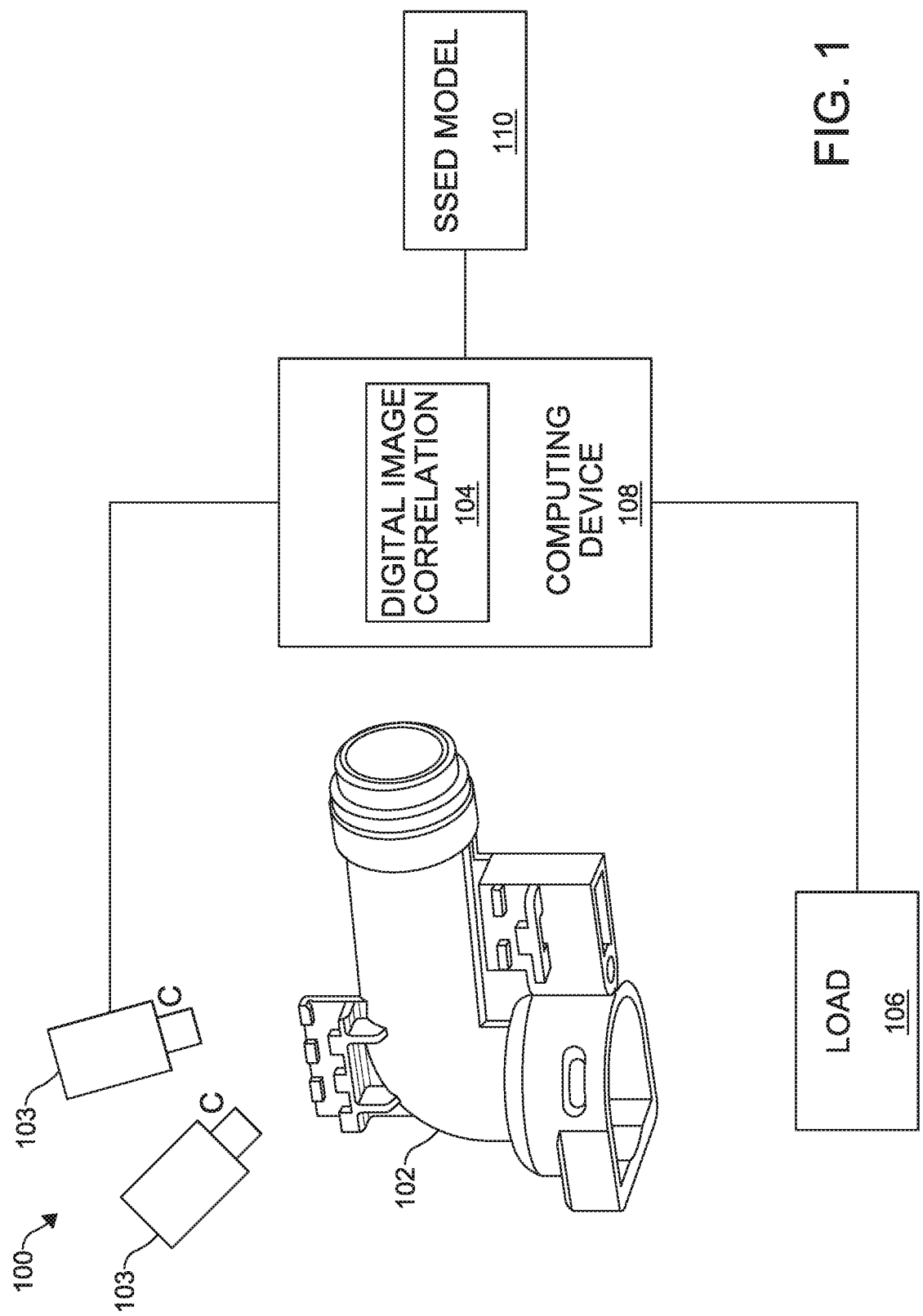
FIG. 1 shows a schematic of a system according to aspects of the present disclosure.

FIG. 1 illustrates a schematic representation of a system 100 in accordance with aspects of the present disclosure. The system 100 comprises an application 102 such as a component or part, which may be positioned for evaluation. Evaluation may comprise digital image correlation 104, which may be based upon information collected by one or more sensors 103 (e.g., optical sensors, cameras, etc.) configured to capture images of the application 102. Evaluation may also comprise applying a load 106 (e.g., fatigue load) to the application 102 to generate stresses or strains in a material surface of the application 102. As an example, a series of images of the application 102 may be captured as various load conditioned are applied to the application 102.

Load conditions may include mechanical loads, thermal loads, vibration loads, pressure loads, and the like. Load conditions may be dynamically or statically applied to the application to facilitate the digital image correlation 104. As an example, images of the application 102 that are captured by the one or more sensors 103 may be processed using the digital image correlation 104. In certain aspects, the captured images may be grey value digital images, which may be analyzed to determine contour and/or displacement of at least a portion of the application 102 when the application is exposed to load 106. Other digital images and processing techniques may be used for digital image correlation 104.

The capture of images and the application of various loads and parallel synchronizing load profiles may be controlled via a computing device 108. As an example, the computing device 108 may be configured to synchronize the capture of images with the application of the loads. Such synchronization may be controlled via hardware and/or software executing via the computing device 108.

The captured images and information generated from the digital image correlation 104 may be processed to generate a surface strain energy density (SSED) model 110 for the application 102. The SSED model 110 may be calculated based on the optical 3D-full strain field measurement (e.g., the digital image correlation 104). The SSED model 110 may be to characterize the lifetime or wear of the application 102 for various loading conditions. As used herein, lifetime evaluation may relate to a wear parameter during any point in a lifecycle of a material or product. Lifetime evaluation may comprise predictive modeling for wear points and potential failure and/or comparative or relative wear or failure analysis. The critical surface region for strain energy density are normally hot spots for potential failure like weld-line, higher stress gradient regions, notches etc. As described herein, in high and low-life regions of an application (e.g., application 102), the strain energy density is a consistent parameter differentiated according to energy loss for low life or elastic energy for high life. As such, reliance on the SSED model 110 for determining wear and/or lifetime of an application provides an improvement over conventional testing methods. For example, conventional stress vs. cycle to failure models focus on fatigue behavior under constant load conditions or simple geometries. This includes constant load parameters such as load ratio, temperature, directionality (e.g., multi-axial), etc. Such conventional modeling may not be a time/cost effective approach due at least in part to the number of experiments typically required to investigate such fatigue behavior. Instead, the SSED model 110 according to the present disclosure provides an efficient rapid evaluation tool for testing along the life cycle of the subject application from conception to fatigue.

In certain aspects, the systems and methods of the present disclosure may be applied in a predictive nature, whereby the resultant SSED model 110 may be used as a material fatigue model for design and product development. As an example, the SSED model 110 may be used as part of or replacement for a software modeling tool to assist with material selection, design modeling, and predictive performance modeling.

In certain aspects, the systems and methods of the present disclosure may be applied as part of an optimization cycle, whereby the systems and methods of the present disclosure may be provided as a testing bench for optimization of a product such as a material application. As an example, the improved efficiency of evaluation of the present disclosure over the conventional modeling tools allows multiple experiments using various materials, loading conditions, shapes, designs, and the like. Such quick testing may provide additional predictive data in optimizing a solution for a given application, such as prototype testing and evaluation.

In certain aspects, the systems and methods of the present disclosure may be applied as part of an application and/or process validation procedure. For example, part performance and feedback loops relating to various processes may be analyzed over time (with or without extrinsic information). As a further example, such a validation procedure may be used as or in conjunction with regulatory testing, material certification, and/or assistance in product certification.

In certain aspects, the systems and methods of the present disclosure may be applied as part of an application and/or process quality control check. During manufacturing and commercialization of a product, the system and methods of the present disclosure including the SSED model 110 may be used as a rapid quality control check on various manufactured parts, runs, batches, and the like. Furthermore, the SSED model 110 may provide a predictive lifetime measurement for scoping repair, replacement, and maintenance of various parts and components in a particular environment.

The systems and methods of the present disclosure may include software and/or hardware components that may be used in conjunction with or as a replacement for conventional programs and platforms such as those conventionally relied up for filling simulation, fiber orientation distribution and microstructure analysis, local property analysis, anisotropic material modeling, part performance modeling, in-situ strain validation, and time-to-failure analysis.

Figure 2:
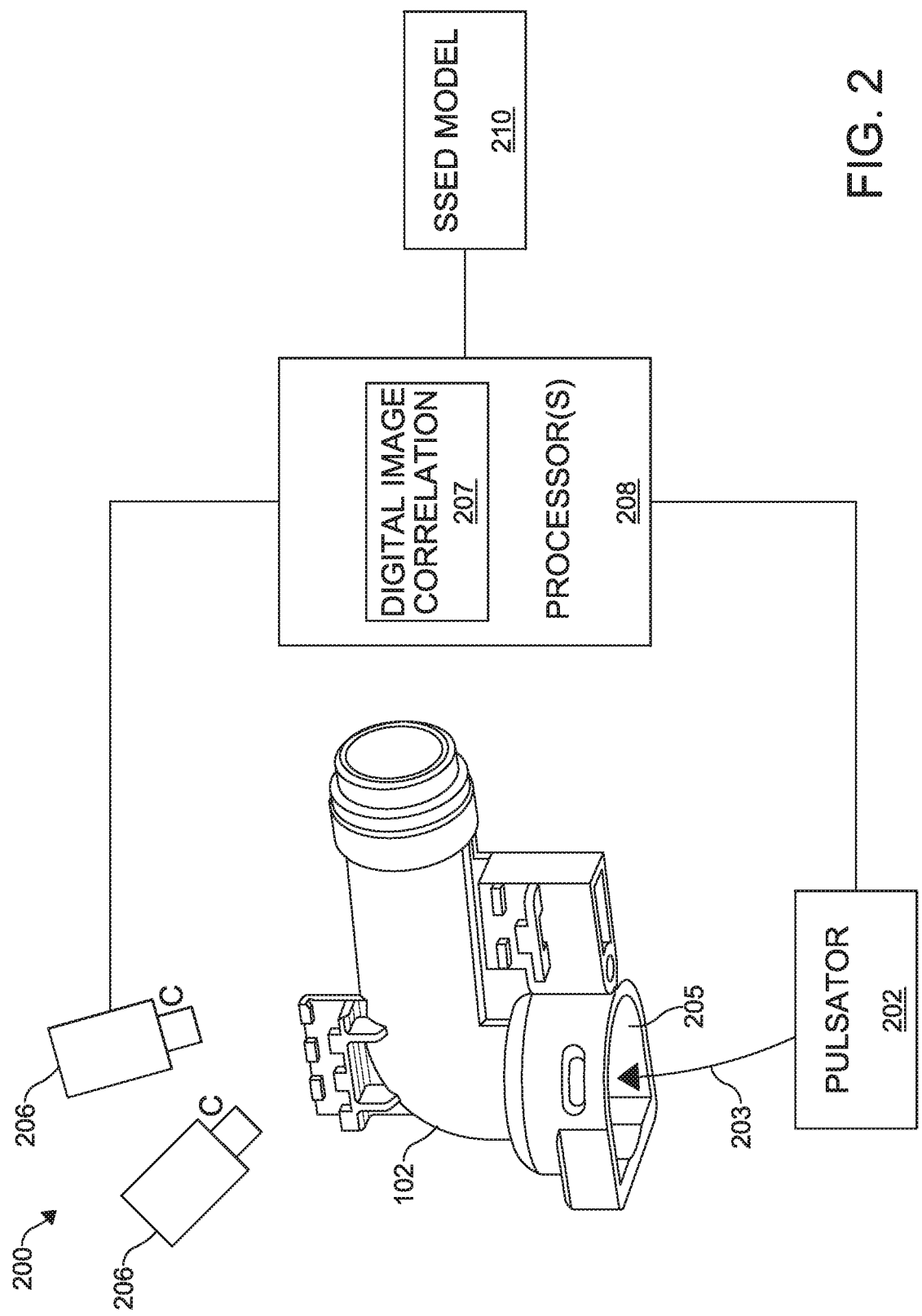
FIG. 2 shows a schematic of a system according to aspects of the present disclosure.

FIG. 2 illustrates a schematic representation of a system 200 in accordance with aspects of the present disclosure. As a non-limiting example, the system 200 relates to water management applications. It is understood that other environments and applications may make similar use of the systems and methods described.

The system 200 may comprise a pulsator 202 configured to apply a stress or a strain to a material surface 204 based at least on a cycle of properties over time. The material surface 204 may be a surface of a component or part. The material surface may include a hot spot region such as an area subject to fatigue or failure (e.g., weldline, notch, etc.). Although aspects are described in reference to the pulsator 202, it is understood that various load generators may be used to apply a stress or a strain to the material surface using any loading apparatus. As shown, the pulsator 202 may be configured to control the cyclic pressure and temperature of a fluid 203 pumped into a channel 205 defined by the material surface 204. The cycle of properties of the pumped fluid 203 may comprise a change in temperature or a change in pressure, or both.

A sensor 206 may be configured to capture an image of the material surface 204. The sensor 206 may comprise one or more digital cameras. In certain aspects, at least two cameras may be positioned to capture various points of views of an area of the material surface 204. As an example, a series of images may be captured and processed using digital image correlation (DIC) 207 to generate a model of a region or complete component. The DIC 207 image capture and processing may include deformation mapping and/or volume correlation based on two dimensional and/or three dimension surfaces and object. It is understood that various DIC techniques may be used without departing from the spirit of the present disclosure.

The capture of the image may be correlated to the cycle of properties of the load provided by the pulsator 202. As an example, the capture of the image may be synchronized with the cycle of properties of the load provided by the pulsator 202. As a further example, the capture of the image may be correlated with the cycle of properties using images capture and processed by DIC 207. The images may be used to synchronize the peaks of a cycle of properties with the capture of images. As the pulsator 202 applies a stress or a strain, a load profile (e.g., pressure signal from a pre-amp) may be used to trigger capture of images at particular points in the load profile. Various rules and thresholds may be used to trigger the capture of the images based on the load profile.

One or more processors 208 may be configured to determine a surface strain energy density (SSED) model 210 for the material surface 204 based at least on the images captured by the sensor 206. Various energy density functions may be used to generate the SSED model 210. The processor 208 may be further configured to determine a lifetime parameter associated with the material surface 204 based at least on the SSED model 210. For example, the SSED model 210 may be compared to records of known records to determine a remaining life of the component. As a further example, the lifetime parameter may be any wear or failure parameter (e.g., predictive parameter) relating to the lifecycle of a material or product.

Whether such functionality is implemented as hardware or software depends upon the design constraints imposed on the overall system. Skilled persons may implement the described functionality in varying ways for each particular application, but such implementation decisions should not be interpreted as causing a departure from the scope of the disclosure. In addition, the grouping of functions within a module, block, or step is for ease of description. Specific functions or steps may be moved from one module or block without departing from the disclosure.

The various illustrative logical blocks and modules described in connection with the aspects disclosed herein may be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor (e.g., of a computer), or in a combination of the two. A software module may reside, for example, in random-access memory (RAM), flash memory, read only memory (ROM), erasable programmable read-only memory (EPROM), electrically erasable programmable read-only memory EEPROM, registers, hard disk, a removable disk, a compact disc read only memory (CD-ROM), or any other form of storage medium. An exemplary storage medium may be coupled to the processor such that the processor may read information from, and write information to, the storage medium. In the alternative, the storage medium may be integral to the processor. The processor and the storage medium may reside in an application-specific integrated circuit (ASIC).

In at least some aspects, a processing system (e.g., the systems 100, 200 or one or more computing devices executing software embodying the systems 100, 200) that implements a portion or all of one or more of the technologies described herein may include a general-purpose computer system that includes or is configured to access one or more computer-accessible media.

Figure 3:
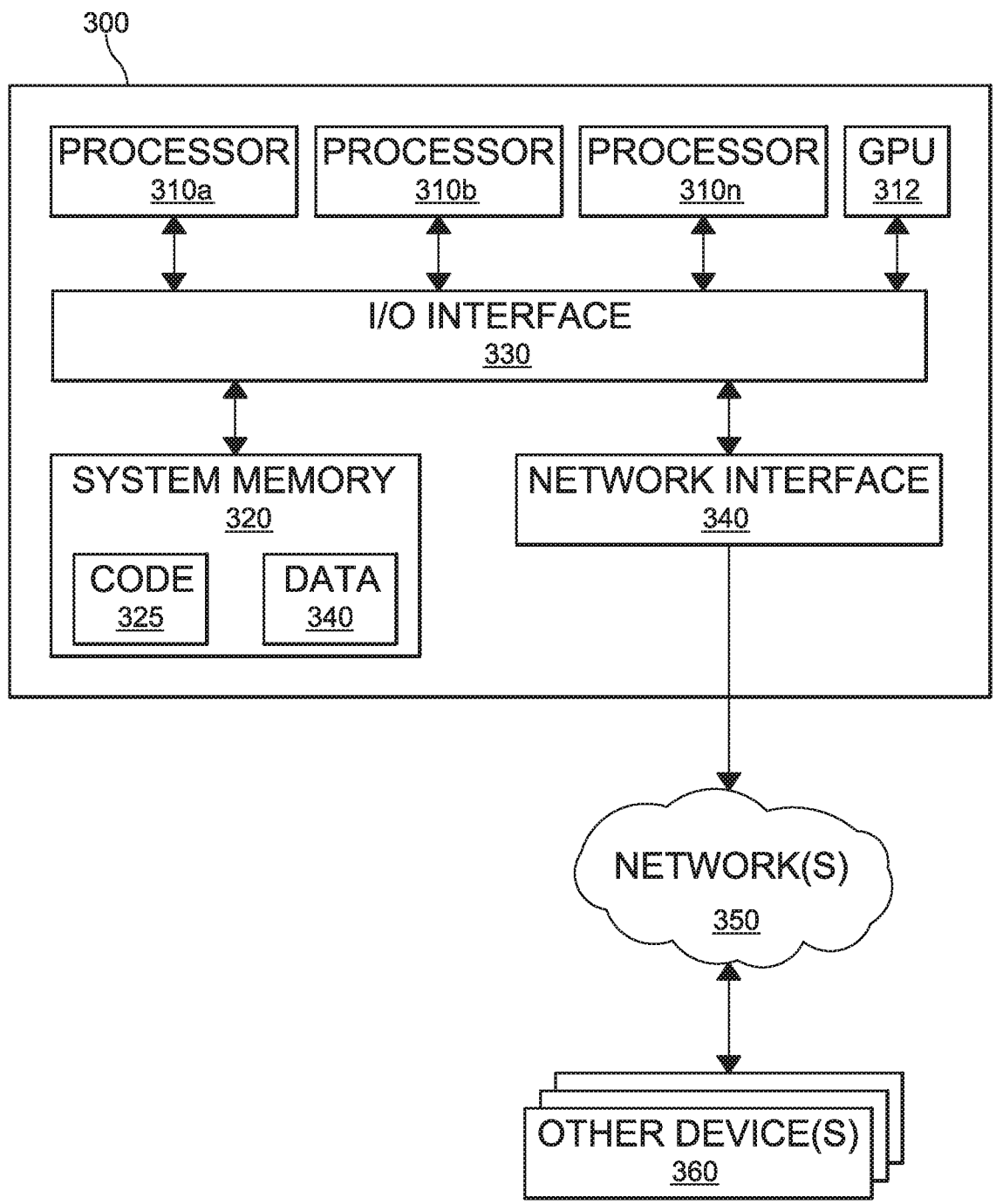
FIG. 3 shows a schematic of a system according to aspects of the present disclosure.

FIG. 3 depicts a general-purpose computer system that includes or is configured to access one or more computer-accessible media. In the illustrated aspect, a computing device 300 may include one or more processors 310a, 310b, and/or 310n (which may be referred herein singularly as the processor 310 or in the plural as the processors 310) coupled to a system memory 320 via an input/output (I/O) interface 330. The computing device 300 may further include a network interface 340 coupled to an I/O interface 330.

In various aspects, the computing device 300 may be a uniprocessor system including one processor 310 or a multiprocessor system including several processors 310 (e.g., two, four, eight, or another suitable number). The processors 310 may be any suitable processors capable of executing instructions. For example, in various aspects, the processor(s) 310 may be general-purpose or embedded processors implementing any of a variety of instruction set architectures (ISAs), such as the x86, Performance Optimization with Enhanced RISC (Reduced instruction set computing)—Performance computing (PowerPC), Scalable Processor Architecture (SPARC), or MIPS ISAs (instruction set architecture), or any other suitable ISA. In multiprocessor systems, each of the processors 310 may commonly, but not necessarily, implement the same ISA.

In some aspects, a graphics processing unit ("GPU") 312 may participate in providing graphics rendering and/or physics processing capabilities. A GPU may, for example, include a highly parallelized processor architecture specialized for graphical computations. In some aspects, the processors 310 and the GPU 312 may be implemented as one or more of the same type of device.

The system memory 320 may be configured to store instructions and data accessible by the processor(s) 310. In various aspects, the system memory 320 may be implemented using any suitable memory technology, such as static random access memory ("SRAM"), synchronous dynamic RAM ("SDRAM"), nonvolatile/Flash™-type memory, or any other type of memory. In the illustrated aspect, program instructions and data implementing one or more desired functions, such as those methods, techniques and data described above, are shown stored within the system memory 320 as code 325 and data 326.

In one aspect, the I/O interface 330 may be configured to coordinate I/O traffic between the processor(s) 310, the system memory 320 and any peripherals in the device, including a network interface 340 or other peripheral interfaces. In some aspects, the I/O interface 330 may perform any necessary protocol, timing or other data transformations to convert data signals from one component (e.g., the system memory 320) into a format suitable for use by another component (e.g., the processor 310). In some aspects, the I/O interface 330 may include support for devices attached through various types of peripheral buses, such as a variant of the Peripheral Component Interconnect (PCI) bus standard or the Universal Serial Bus (USB) standard, for example. In some aspects, the function of the I/O interface 330 may be split into two or more separate components, such as a north bridge and a south bridge, for example. Also, in some aspects some or all of the functionality of the I/O interface 330, such as an interface to the system memory 320, may be incorporated directly into the processor 310.

The network interface 340 may be configured to allow data to be exchanged between the computing device 300 and other device or devices 360 attached to a network or networks 350, such as other computer systems or devices, for example. In various aspects, the network interface 340 may support communication via any suitable wired or wireless general data networks, such as types of Ethernet networks, for example. Additionally, the network interface 340 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 320 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 300 via the I/O interface 630. A non-transitory computer-accessible storage medium may also include any volatile or non-volatile media, such as RAM (e.g., SDRAM, double data rate synchronous dynamic random-access memory (DDR SDRAM), rambus dynamic random access memory (RDRAM), SRAM, etc.), ROM, etc., that may be included in some aspects of the computing device 300 as the system memory 320 or another type of memory. Further, a computer-accessible medium may include transmission media or signals, such as electrical, electromagnetic or digital signals, conveyed via a communication medium, such as a network and/or a wireless link, such as those that may be implemented via the network interface 340. Portions or all of multiple computing devices, such as those illustrated in FIG. 3, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, personal digital assistants (PDAs), tablets, cellphones, wireless phones, pagers, electronic organizers, Internet appliances, and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the disclosure may be practiced with other computer system configurations.

Operation of the systems of the present disclosure is further detailed in reference to methods illustrated in FIGS. 4-5, and described herein below.

Methods

Figure 4:
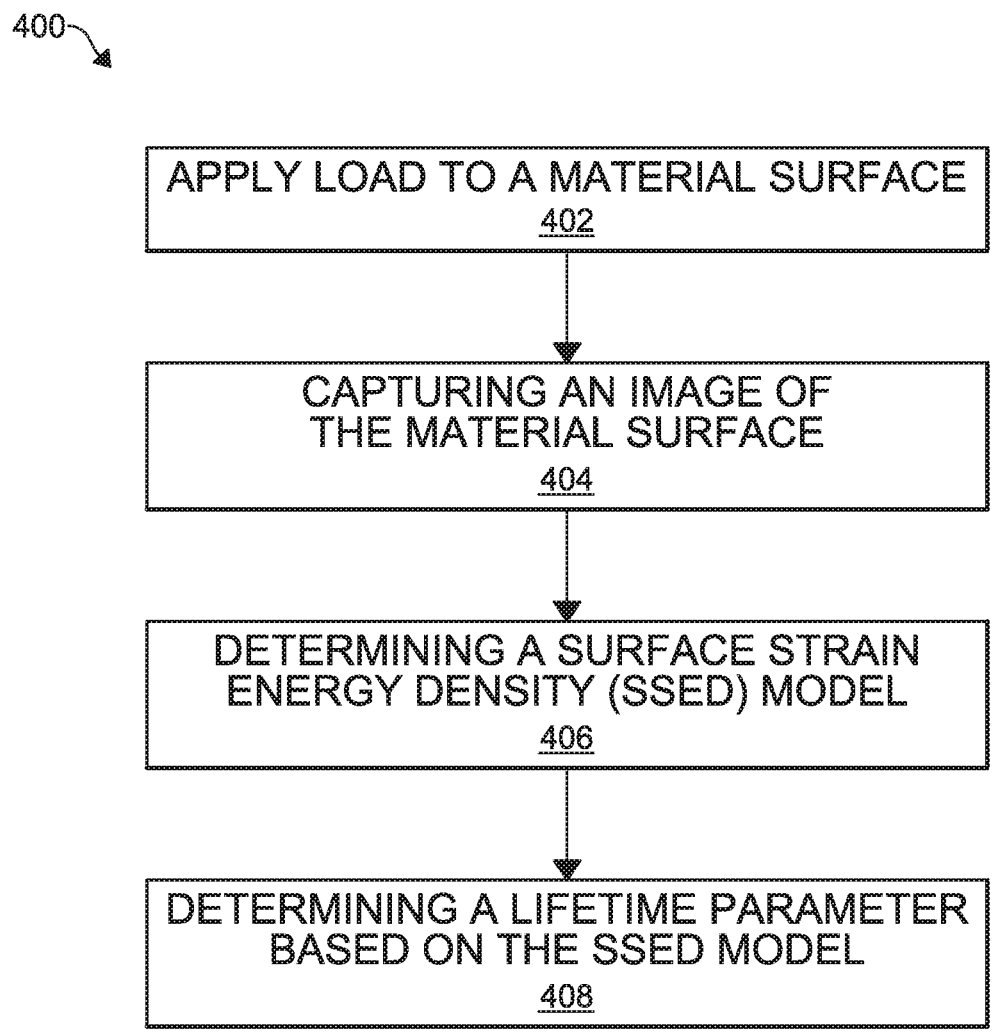
FIG. 4 shows a flow diagram of a method according to aspects of the present disclosure.

FIG. 4 illustrates a method flow diagram of an example method 400 for material evaluation. At step 402, a load (e.g., a stress or a strain) may be to be applied to a material surface. Causing the stress or the strain to be applied to the material surface may comprise applying forces to the material surface using a loading apparatus such as a pulsator. The load may be applied in a cyclical manner such as based at least on a cycle of properties over time. Such properties may comprise temperature, pressure, and the like. The cycle of properties may comprise a load by means of change in temperature or a change in pressure, or change in force or change in displacement or combinations. The load may be applied based on a pre-defined load profile of varying properties. In certain aspects, the material surface may comprise a hotspot region and the load may be applied to such a hot spot region.

At step 404, an image of the material surface may be captured. The capture of the image may be correlated to the cycle of properties. For example, the capture of the image may be synchronized with the loading properties. As a further example, the capture of the image is correlated with the loading properties using digital image correlation (DIC). DIC may include the capture and processing of certain images such as a grey value digital images and/or a series of images, which may be analyzed to determine contour and/or displacement/deformation of at least a portion of the material surface when the surface is exposed to the load. Other digital images and processing techniques may be used for DIC.

At step 406, a surface strain energy density (SSED) model may be determined for the material surface based at least on the captured image. Determining the surface strain energy density (SSED) model may comprise determining an area of a hysteresis of a stable strain region of the material surface. Various energy density functions like energy loss, elastic energy may be used to generate the SSED model.

At step 408, a lifetime parameter associated with the material surface may be determined. The lifetime parameter may be based at least on the SSED model as a material model. For example, the SSED model may be compared to records of known records to determine a remaining life of the component. As a further example, the lifetime parameter may be any predictive wear or failure parameter relating to the lifecycle of a material or product.

Figure 5:
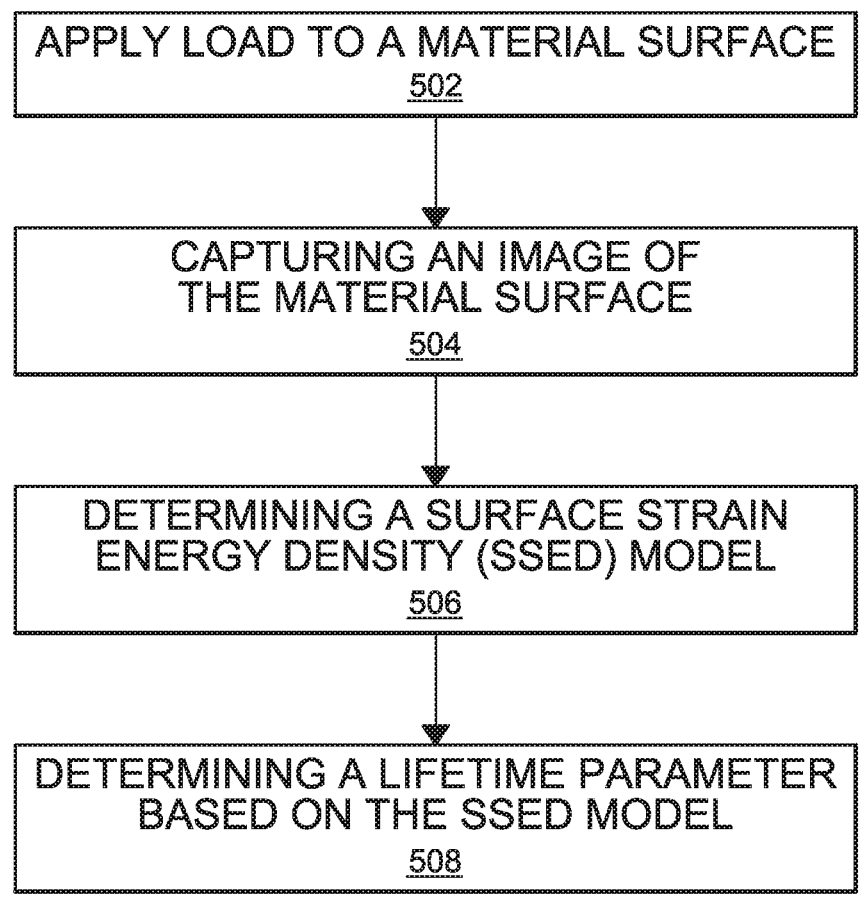
FIG. 5 shows a flow diagram of a method according to aspects of the present disclosure.

FIG. 5 illustrates a method flow diagram of an example method 500 for material evaluation. At step 502, a stress or a strain to be applied to a material surface based at least on a cycle of properties over time. Causing the stress or the strain to be applied to the material surface may comprise applying forces to the material surface using a loading apparatus such as a pulsator. The load may be applied in a cyclical manner such as based at least on a cycle of properties over time. Such properties may comprise temperature, pressure, and the like. The cycle of properties may comprise a load by means of change in temperature or a change in pressure, or change in force or change in displacement or combinations. The load may be applied based on a pre-defined load profile of varying properties. In certain aspects, the material surface may comprise a hotspot region and the load may be applied to such a hot spot region.

At step 502, a first image of a first portion of the material surface may be captured. The capture of the first image may be correlated to the cycle of properties. For example, the capture of the first image may be synchronized with the loading properties. As a further example, the capture of the first image is correlated with the loading properties using digital image correlation (DIC). DIC may include the capture and processing of certain images such as a grey value digital images and/or a series of images, which may be analyzed to determine contour and/or displacement of at least a portion of the material surface when the surface is exposed to the load. Other digital images and processing techniques may be used for DIC.

At step 502, a second image of a second portion of the material surface may be captured. The capture of the second image may be correlated to the cycle of properties. For example, the capture of the second image may be synchronized with the loading properties. As a further example, the capture of the second image is correlated with the loading properties using digital image correlation (DIC). DIC may include the capture and processing of certain images such as a grey value digital images and/or a series of images, which may be analyzed to determine contour and/or displacement/deformation of at least a portion of the material surface when the surface is exposed to the load. Other digital images and processing techniques may be used for DIC.

At step 506, a surface strain energy density (SSED) model may be determined for the material surface based at least on the captured first image and second image. Determining the surface strain energy density (SSED) model may comprise determining an area of a hysteresis of a stable strain region of the material surface. Various energy density functions like energy loss or elastic energy may be used to generate the SSED model.

At step 508, a lifetime parameter associated with the material surface may be determined. The lifetime parameter may be based at least on the SSED model as a material model. For example, the SSED model may be compared to records of known records to determine a remaining life of the component.

Figure 6:
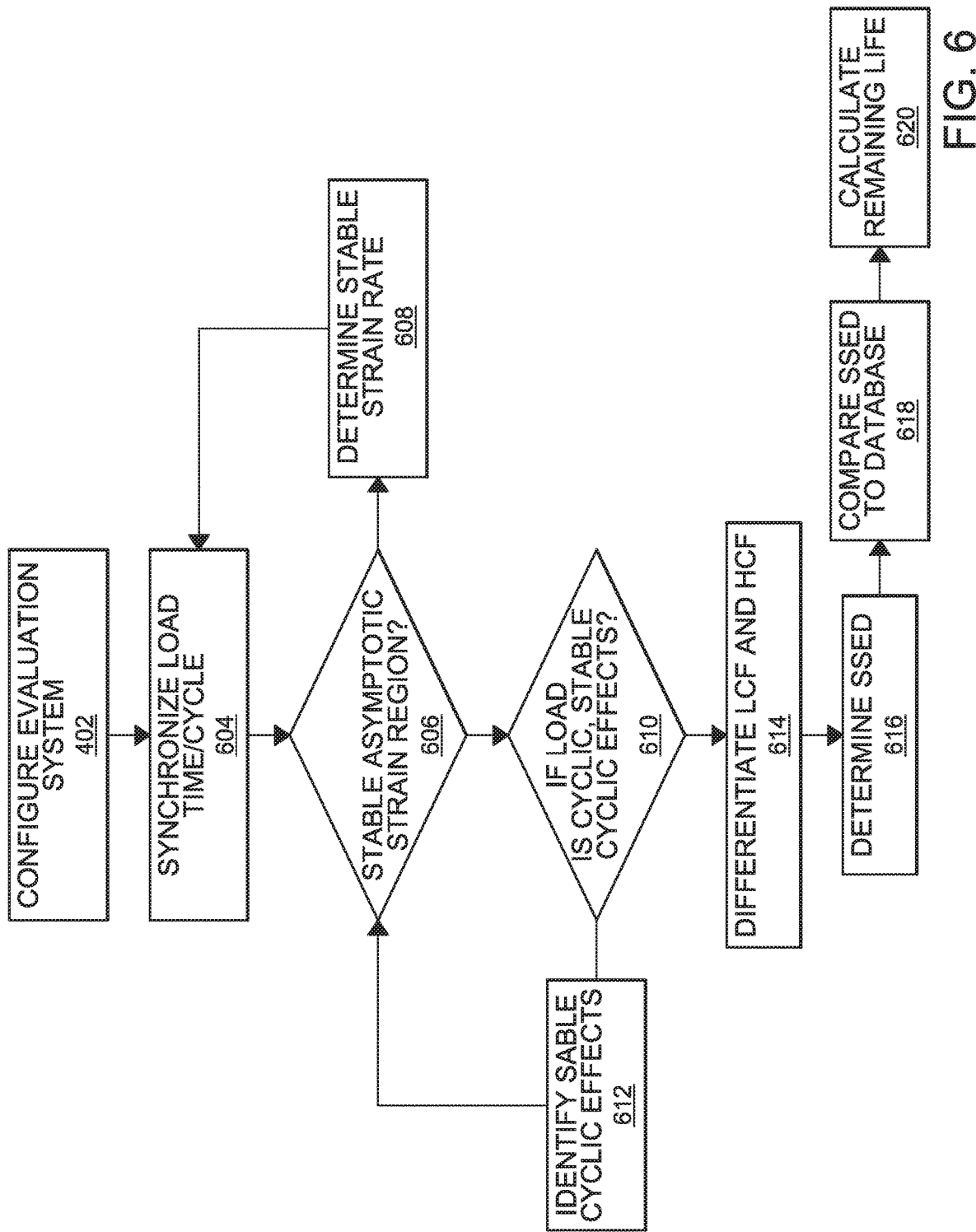
FIG. 6 shows a flow diagram of a method according to aspects of the present disclosure.

FIG. 6 illustrates a method flow diagram of an example method 600 for material evaluation. At step 602, an evaluation system may be configured. Such configuration may comprise positioning an application such as a component or part to be subjected to a load. Additionally, one or more cameras may be positioned to capture images of the application. The evaluation system may be configured to apply a load to a material surface of the application using a loading apparatus such as a pulsator. The load may be applied in a cyclical manner such as based at least on a cycle of properties over time. Such properties may comprise temperature, pressure, and the like. The cycle of properties may comprise a load by means of change in temperature or a change in pressure, or change in force or change in displacement or combinations. The load may be applied based on a predefined load profile of varying properties. In certain aspects, the material surface may comprise a hotspot region and the load may be applied to such a hot spot region.

The capture of the image may be correlated to the cycle of properties. For example, the capture of the image may be synchronized with the loading properties, at 604. As a further example, the capture of the image is correlated with the loading properties using digital image correlation (DIC). DIC may include the capture and processing of certain images such as a grey value digital images and/or a series of images, which may be analyzed to determine contour and/or displacement/deformation of at least a portion of the material surface when the surface is exposed to the load. Other digital images and processing techniques may be used for DIC.

At 606, a determination of stable asymptotic strain region is made and the synchronized surface stress-strain field from the image series may be analyzed to determine stable strain rate, at 608. For example, a component that is loaded may immediately exhibit visual elastic or plastic deformations depending on the amplitude of loading and test conditions. Prior to failure, the component may exhibit fluctuation in deformations, due to the intrinsic material deformations. In order to avoid the initial and final phase of loading, a steady-state region of testing has to be selected for processing the images. If the stable steady-state strain region is not reached, the method may continue to step 608 to evaluate the stable strain rate (kinetics of strain) from the processed images. Residual strain may be used as an indicator of cumulated visco-plastic strain. If the cumulated strain is stable, a hysteresis of the synchronized stress-strain is generated. If the cumulated strain is unstable, the cycle/time is repeated, at 604, until strain rate is stable.

At 610, it may be determined whether the load is cyclic. As an example, a component/part subjected to cyclic loading may exhibit one of the following asymptotic cyclic states: elastic shakedown, plastic shakedown, or ratcheting. Pure ratcheting in particular leads to failure relatively easily and early. If the load is cyclic, stable cyclic effects (e.g., damping, stiffness, etc.) may be identified, at 612. For example, presence of cyclic effects may be analyzed by means of investigating cyclic damping factor according to B. J. Lazan, Damping of materials and members in structural mechanics, New York: Pergamon press, 1968, the disclosure of which is incorporated herein by this reference in its entirety. As a further example, the cyclic damping ($\Lambda$) is defined as the ratio of dissipated energy and the energy stored during an equivalent elastic loading:

$$\Lambda = \frac{\Delta W_{SL}}{\Delta W_{SE}},$$

where $\Delta W_{SL}$ is the dissipated energy loss and $\Delta W_{SE}$ is the elastic deformation energy.

Figure 10A:
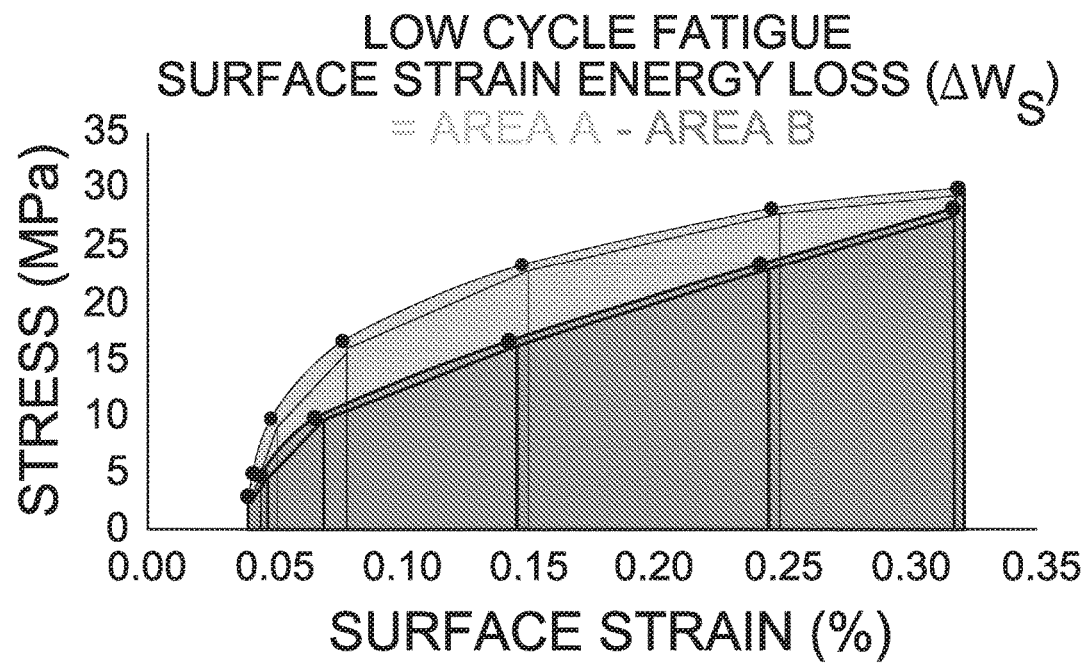
FIGS. 10A and 10B show $\sigma$-$\varepsilon$ plots averaged for five cycles loading and unloading over a stable area.
Figure 10B:
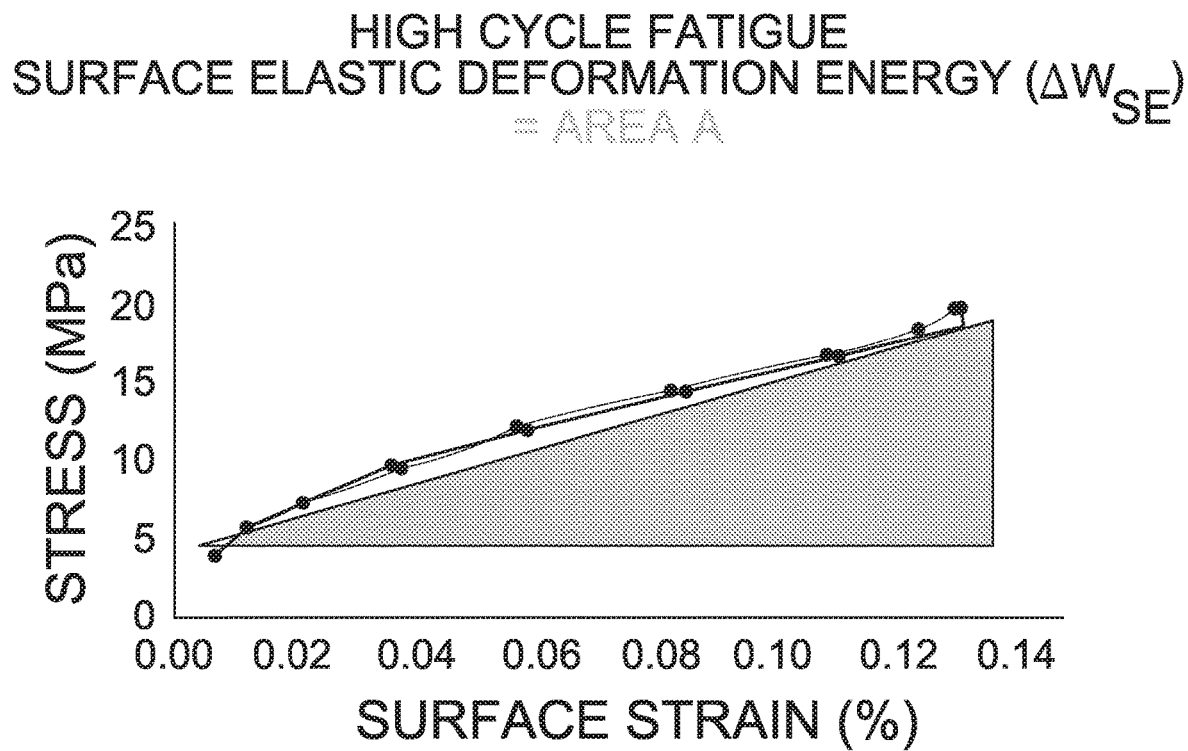

At 614, low cycle fatigue (LCF) and high cycle fatigue (HCF) may be differentiated in the data points. As an example, surface stress vs. strain may be analyzed based on the following principles: At low cycle fatigue (LCF), higher surface mechanical energy loss is dissipated. For instance, with higher temperature, the lost loop energy gets higher, for the same stress amplitude. Therefore, the stored material energy is taken as the loop area of the hysteresis (FIGS. 10A-10B). The stored material energy or loss energy during testing can be denoted as $\Delta W_{SL}$. At high cycle fatigue (HCF), lower surface energy loss will be minimal. Calculating the loss energy will be impossible. Therefore the deformation energy is calculated and will be subsequently used as a damage parameter (DP) for the fatigue model as illustrated in FIGS. 10A-10B. This parameter is denoted as surface elastic deformation energy $\Delta W_{SE}$. As a further example, surface strain energy density (SSED) changes between deformation energy and loss energy based on LCF or HCF.

At 616, a SSED model of the material may be determined. As an example, the SSED model may be determined by calculating the area of hysteresis on the stable strain region. At 618, a SSED value from the SSED model may be compared to a record or value in a database. At 620, a lifetime of the part/component may be determined based at least on the comparative analysis of the SSED values against stored information. Other techniques for analyzing the SSED model and values may be used including heuristics and machine learning.

EXAMPLES

The disclosed systems and methods include at least the following examples.

Example 1: A method for material lifetime evaluation, the method comprising: causing a stress or a strain to be applied to a material surface based at least on a cycle of properties over time; causing an image of the material surface to be captured, wherein the capture of the image is correlated to the cycle of properties; and determining a surface strain energy density (SSED) model for the material surface based at least on the captured image.

Example 2: A method for material lifetime evaluation, the method consisting essentially of: causing a stress or a strain to be applied to a material surface based at least on a cycle of properties over time; causing an image of the material surface to be captured, wherein the capture of the image is correlated to the cycle of properties; and determining a surface strain energy density (SSED) model for the material surface based at least on the captured image.

Example 3: A method for material lifetime evaluation, the method consisting: causing a stress or a strain to be applied to a material surface based at least on a cycle of properties over time; causing an image of the material surface to be captured, wherein the capture of the image is correlated to the cycle of properties; and determining a surface strain energy density (SSED) model for the material surface based at least on the captured image.

Example 4: The method of any one of examples 1-3, further comprising determining a lifetime parameter associated with the material surface based at least on the SSED model as a material model.

Example 5: The method of any one of examples 1-4, wherein causing the stress or the strain to be applied to the material surface comprises applying forces to the material surface using a loading apparatus.

Example 6: The method of any one of examples 1-5, wherein the cycle of properties comprises a load by generated by a change in temperature, a change in pressure, a change in mechanical force, a change in displacement, or a combination thereof.

Example 7: The method of any one of examples 1-6, wherein the material surface comprises a hotspot region critical to failure.

Example 8: The method of any one of examples 1-7, wherein the capture of the image is synchronized with the cycle of properties.

Example 9: The method of any one of examples 1-8, wherein the capture of the image is correlated with the cycle of properties using digital image correlation (DIC).

Example 10: The method of any one of examples 1-9, wherein causing the stress or the strain to be applied to the material surface is implemented using a loading apparatus.

Example 11: The method of any one of examples 1-10, wherein causing the image of the material surface to be captured comprises causing a series of images of the material surface to be captured.

Example 12: The method of any one of examples 1-11, wherein determining the surface strain energy density (SSED) model comprises determining an area of a hysteresis of a stable strain region of the material surface.

Example 13: A system for material evaluation, the system comprising: a load generator configured to apply a stress or a strain to a material surface based at least on a cycle of properties over time; a sensor configured to capture an image of the material surface, wherein the capture of the image is correlated to the cycle of properties; and a processor configured to determine a surface strain energy density (SSED) model for the material surface based at least on the captured image.

Example 14: A system for material evaluation, the system consisting essentially of: a load generator configured to apply a stress or a strain to a material surface based at least on a cycle of properties over time; a sensor configured to capture an image of the material surface, wherein the capture of the image is correlated to the cycle of properties; and a processor configured to determine a surface strain energy density (SSED) model for the material surface based at least on the captured image.

Example 15: A system for material evaluation, the system consisting of: a load generator configured to apply a stress or a strain to a material surface based at least on a cycle of properties over time; a sensor configured to capture an image of the material surface, wherein the capture of the image is correlated to the cycle of properties; and a processor configured to determine a surface strain energy density (SSED) model for the material surface based at least on the captured image.

Example 16: The system of any one of examples 13-15, wherein the processor is further configured to determine a lifetime parameter associated with the material surface based at least on the SSED model.

Example 17: The system of any one of examples 13-16, wherein the load generator applies a stress or a strain to the material surface using any loading apparatus.

Example 18: The system of any one of examples 13-17, wherein the cycle of properties comprises a load by generated by a change in temperature, a change in pressure, a change in mechanical force, a change in displacement, or a combination thereof.

Example 19: The system of any one of examples 13-18, wherein the material surface comprises a hotspot region.

Example 20: The system of any one of examples 13-19, wherein the capture of the image is synchronized with the cycle of properties.

Example 21: The system of any one of examples 13-20, wherein the capture of the image is correlated with the cycle of properties using digital image correlation (DIC).

Example 22: The system of any one of examples 13-21, wherein the force generator comprises a loading apparatus.

Example 23: A method for material evaluation, the method comprising: causing a stress or a strain to be applied to a material surface based at least on a cycle of properties over time; causing a first image of a first portion of the material surface to be captured, wherein the capture of the first image is correlated to the cycle of properties; causing a second image of a second portion of the material surface to be captured, wherein the capture of the second image is correlated to the cycle of properties; and determining a surface strain energy density (SSED) model for the material surface based at least on the captured first image and the captured second image.

Example 24: A method for material evaluation, the method consisting essentially of: causing a stress or a strain to be applied to a material surface based at least on a cycle of properties over time; causing a first image of a first portion of the material surface to be captured, wherein the capture of the first image is correlated to the cycle of properties; causing a second image of a second portion of the material surface to be captured, wherein the capture of the second image is correlated to the cycle of properties; and determining a surface strain energy density (SSED) model for the material surface based at least on the captured first image and the captured second image.

Example 25: A method for material evaluation, the method consisting of: causing a stress or a strain to be applied to a material surface based at least on a cycle of properties over time; causing a first image of a first portion of the material surface to be captured, wherein the capture of the first image is correlated to the cycle of properties; causing a second image of a second portion of the material surface to be captured, wherein the capture of the second image is correlated to the cycle of properties; and determining a surface strain energy density (SSED) model for the material surface based at least on the captured first image and the captured second image.

Example 26: The method of any one of examples 23-25, further comprising determining a lifetime parameter associated with the material surface based at least on the SSED model.

Example 27: The method of any one of examples 23-26, wherein causing the stress or the strain to be applied to the material surface comprises applying forces to the material surface using a pressurized fluid.

Example 28: The method of any one of examples 23-27, wherein the cycle of properties comprises a load generated by a change in temperature, a change in pressure, a change in mechanical force, a change in displacement, or a combination thereof.

Example 29: The method of any one of examples 23-28, wherein the material surface comprises a hotspot region critical to failure.

Example 30: The method of any one of examples 23-29, wherein the capture of one or more of the first image and the second image is synchronized with the cycle of properties.

Example 31: The method of any one of examples 23-30, wherein the capture of one or more of the first image and the second image is correlated with the cycle of properties using digital image correlation (DIC).

Example 32: The method of any one of examples 23-31, wherein the material surface forms a portion of a prototype of a component.

Detailed aspects of the present disclosure are disclosed herein; it is to be understood that the disclosed aspects are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

Experimental Protocols

Figure 7:
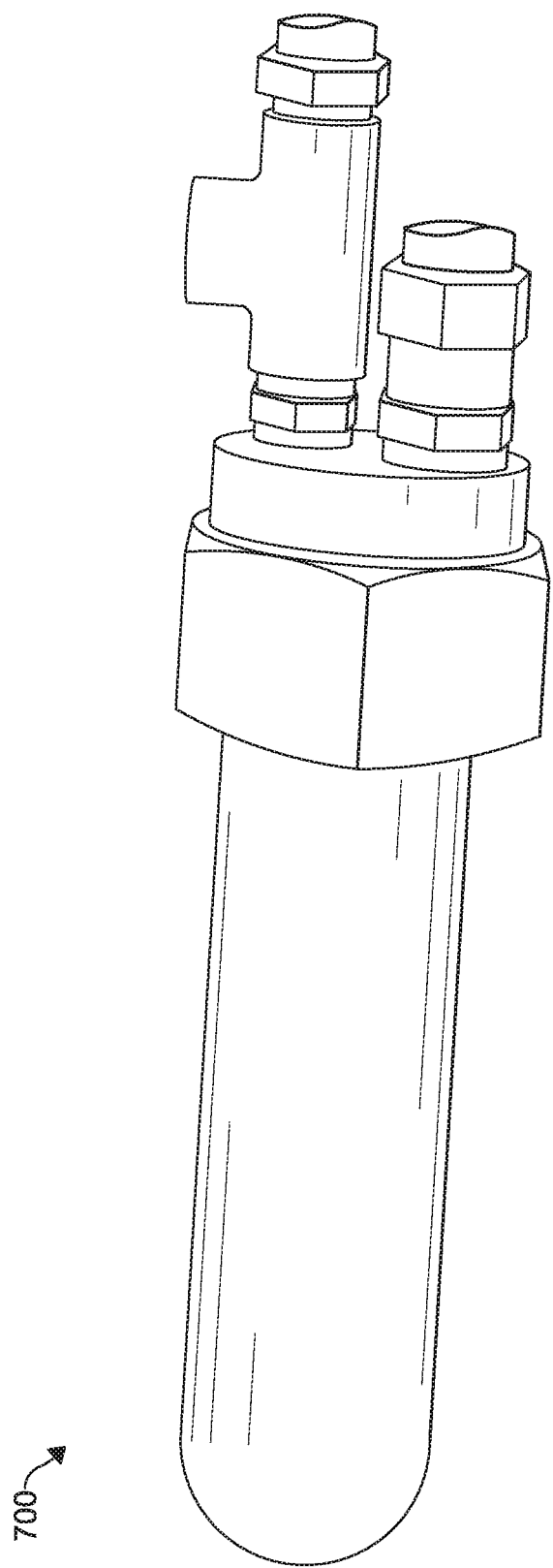
FIG. 7 shows a pressure vessel sample connected to a pulsating pressure according to aspects of the present disclosure.

As a non-limiting, illustrative example, a SABIC Noryl™ FE1630PW resin (polyphenylene oxide/polystyrene (PPOTM/PS) blend polymer, reinforced with 30% short glass fibers) was selected for evaluation. This resin exhibits excellent corrosion properties, hydrolytic stability, high temperature resistance, low water absorption, and good mechanical performance. The material was evaluated using a pressurized cylinder 700, such as illustrated in FIG. 7.

Strain measurement on full field, which may be used for downstream SSED calculation, is performed with a digital image correlation (DIC) system. Experiments were performed in a fluctuating pressure setup with pressure (0.5 bar to 30 bar), R-ratio [$R=\sigma_{min}/\sigma_{max}$] (0.1, 0.2, and 0.5), temperature (30° C., 90° C.) with/without weldline and at a constant frequency of 1 hertz (Hz).

Fatigue Evaluation

The region of fatigue evaluation was performed by measuring the major strain over the surface during the cyclic-loading. The region principally to evaluate for fatigue depends on understanding the hot spot or regions vulnerable to failures. These regions may change with each application and locating a particular region or surface for analyzing can become difficult as these often have complex shapes with more than one curvature. In the example of a hollow cylinder, such stress may be substantially homogeneous and can be evaluated on any region. In case of complex part designs, the hot spots can be identified using anisotropic modeling simulations known in the art. Leveraging anisotropic modeling may include a through process modeling (TPM) establishing a processing-morphology-property relation for SFRP materials. TPM process incorporates the influence of fiber orientation on to the numerical calculations. The critical regions can be identified using TPM, in case the evaluation region is unknown for lifetime prediction.

Figure 8:
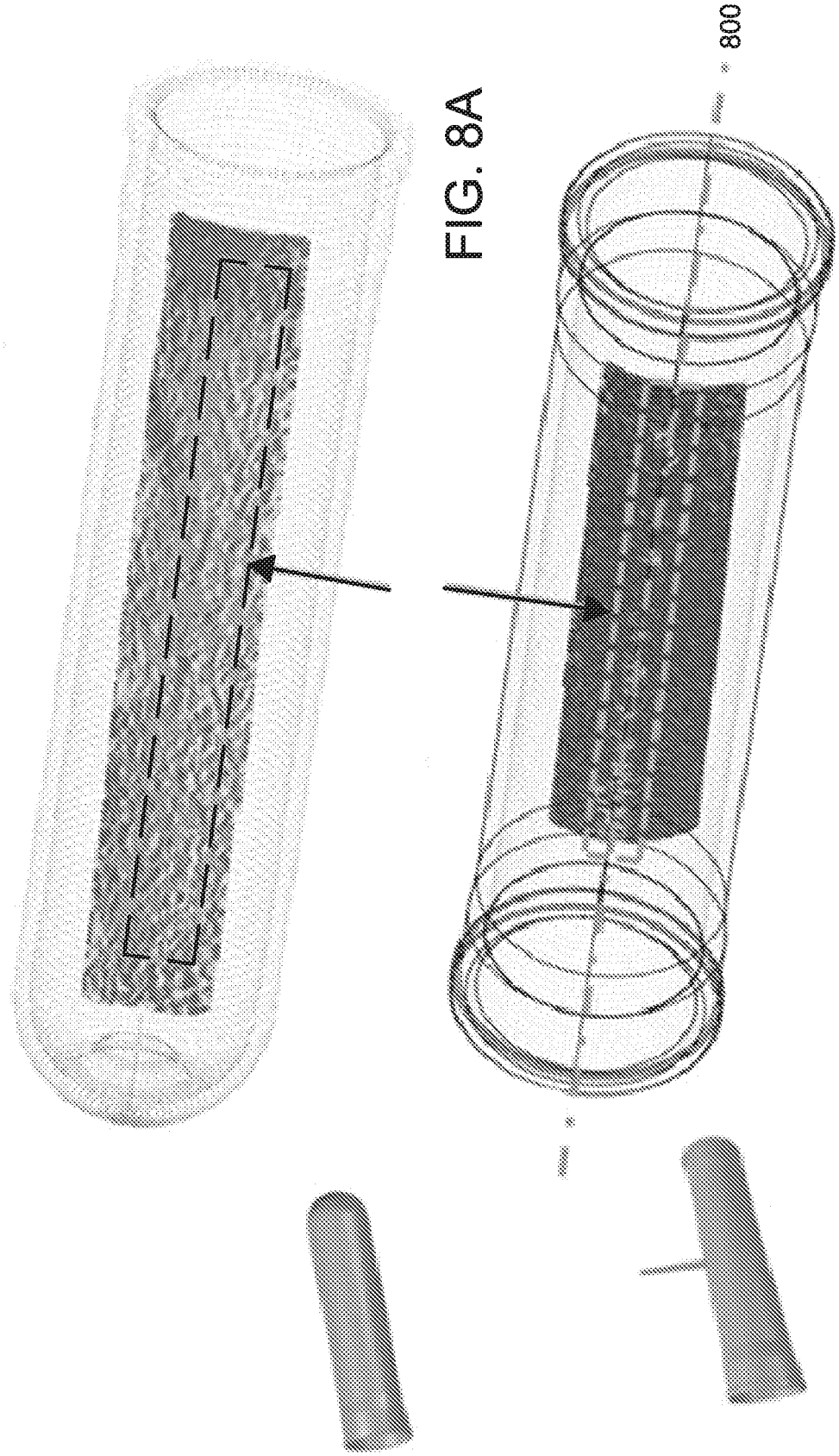

The non-weldline regions were selected based on where the homogenous strain vector and distribution was observed as in FIG. 8A. For weldline samples, the evaluation region was based on the location of the weldline 800 as seen in FIG. 8B. The strain evolution of the specimen was monitored along the lifetime until failure. The strain evolution was recorded from digital impact correlation DIC system triggered at specific log intervals as seen in FIGS. 9-10A and 10B. For the example material, the strain amplitude showed almost constant strain amplitude $\Delta\varepsilon$, although the absolute strain value changed. Nevertheless, this indicates that no cyclic softening/hardening effects were observed on the strain evolution. This gives primary evidence of using a constant strain amplitude $\Delta\varepsilon$ as a damage parameter for the material fatigue calculation.

Figure 9:
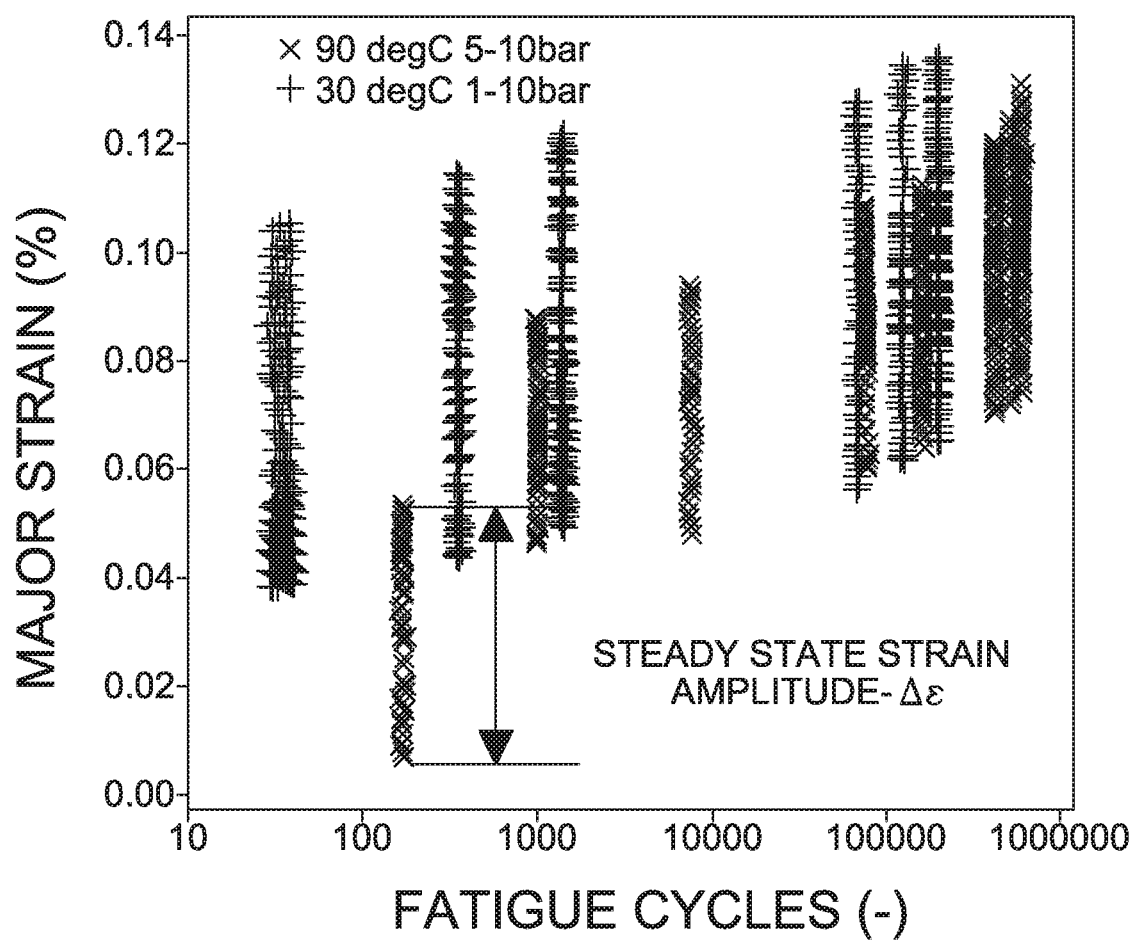
FIG. 9 shows a strain evolution over the lifetime of a specimen for two different load case with measurement based on log intervals.

Typically, the hysteresis loop was observed to be stable after a few cycles (fewer than 10 cycles). As an example, when the variable part of the mechanical response reached a steady-state, the hysteretic area equals the dissipated energy density per cycle. In the same manner the residual strain (indicator of cumulated visco-plastic strain) also reached a stable asymptotic linear evolution (fewer than 100 cycles) and then the residual strain was nearly constant as seen in FIG. 9.

Results & Discussion

As described herein, the material testing and the mathematical modeling of the SED based fatigue modeling may be used for lifetime prediction in the brittle/ductile regime fracture of various materials. Referencing the surface stress-strain curve shown in FIG. 10, the energy absorbed by the samples because of deformation may be calculated by finding the area under the curve. As shown, the strain energy density, $\Delta W$, may be defined as:

$$\Delta W = \int \sigma d\varepsilon \quad (1)$$

, where $\sigma$ is the applied stress (MPa) and $\varepsilon$ measured strain (%). If this is assumed to be completely linear and elastic, the stress-strain curve is a straight line. In such experiments, a non-linear elastic deformation was observed. Plastic strain energy density, $\Delta W$, can be interpreted as damage parameter describing how much mechanical energy the material can absorb. From the FIGS. 10A-B, it is also possible to establish a relationship between the strain energy and the stress-strain amplitudes, $$\Delta W = f(\Delta\varepsilon \times \Delta\sigma) \quad (2)$$

This factor values between $\Delta W$ and ($\Delta\varepsilon \times \Delta\sigma$) may depend on the material property. A single power law (Morrow energy model) was examined. The model predicts the fatigue life ($N_f$) in terms of the strain energy density ($\Delta W$), as shown below;

$$N_f^m(\Delta W) = C \quad (3)$$

where m is the fatigue exponent, and C is material ductility coefficient. The Morrow model, which is a single power law, can be used directly to establish a linear relationship between log(Nf) and log($\Delta\varepsilon \times \Delta\sigma$) according to FIGS. 10A, 10B, and 11, by taking the hysteresis area (energy loss) of $\Delta\varepsilon \times \Delta\sigma$. This is done by individually observing the scatter on fatigue model as seen in FIGS. 10A-B, for all variable parameters. Since the strain energy density values are obtained from a complete field of surface, it is denoted as SSED $\Delta W_s$.

Figure 12A:
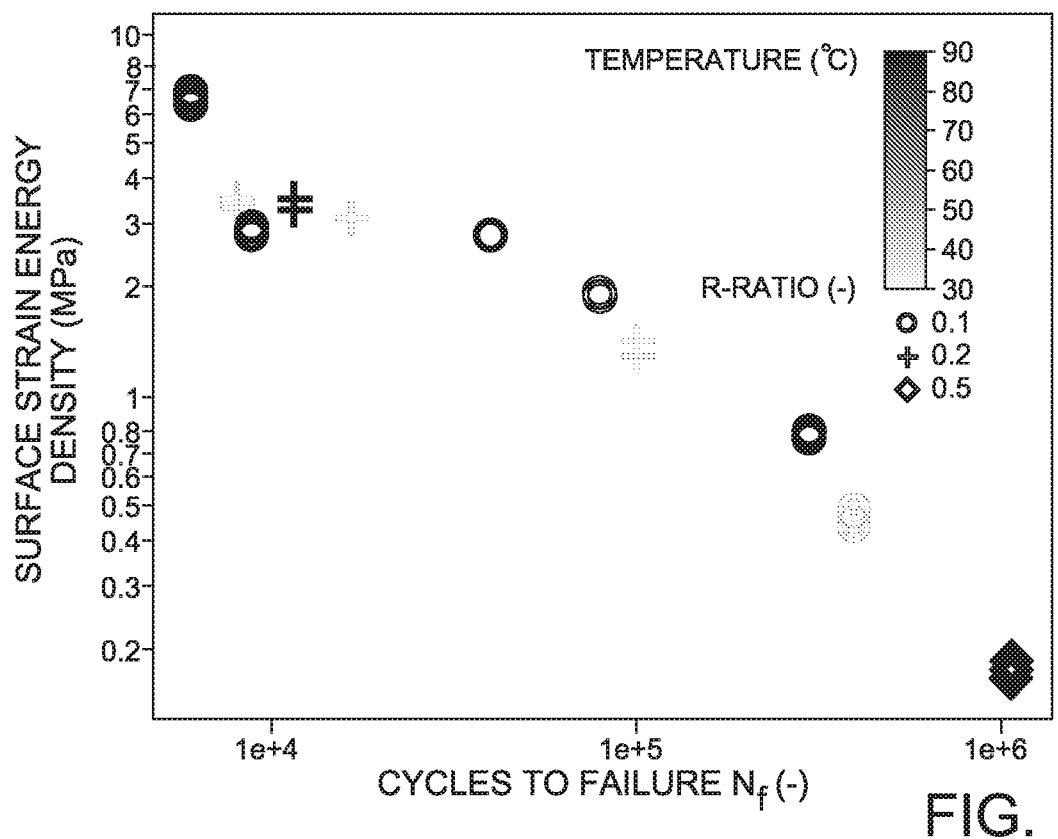
FIGS. 12A-B show a double-log plot $N_f$ vs. $\Delta\varepsilon \times \Delta\sigma$ for different temperature, R-ratio, pressure levels for: (A) side gated non-weldline samples; and (B) side gated weldline samples.
Figure 12B:
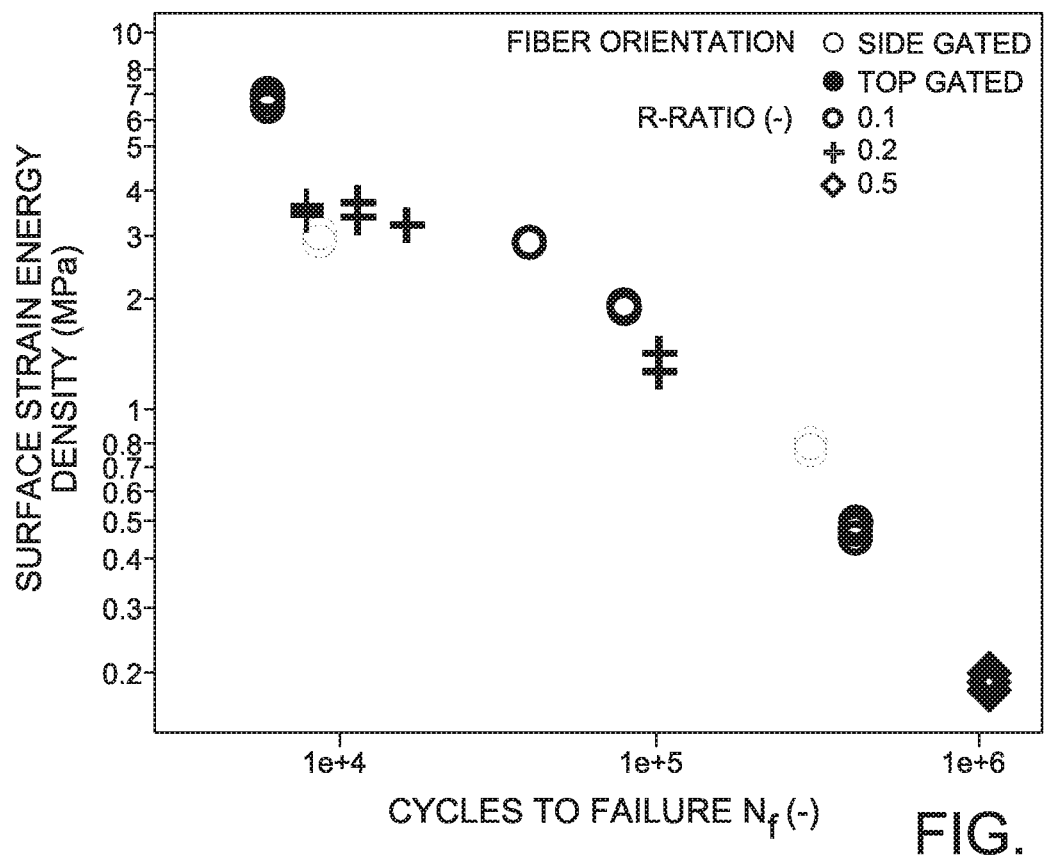

Specimens without weldline (e.g., top-gated) were chosen for the experimental matrix. The effects of temperature along with the different R-ratio experiments on samples without weldline are analyzed separately. There seemed to be no separate shift in slope (m) irrespective of the kind of loading as seen in FIGS. 12A-B, which may be due to the material response and the SSED models changing the surface stress-strain field on constant volume according to the parameters. In certain aspects, a structure subjected to cyclic loading may present one of the following asymptotic states (steady-states): elastic shakedown, plastic shakedown, or ratcheting. Pure ratcheting in particular leads to failure relatively easily and early. These mechanical quantities control the fatigue life (e.g. the number of cycles necessary to reach the steady state). They were found to be minimal for all the experiments and the strain response of the material reached steady state earlier, as relatively compared to the whole lifetime. This steady state of mechanical quantity was one of the reasons the SED models were found to be a better fitting for long time evaluation for these applications.

Figure 11:
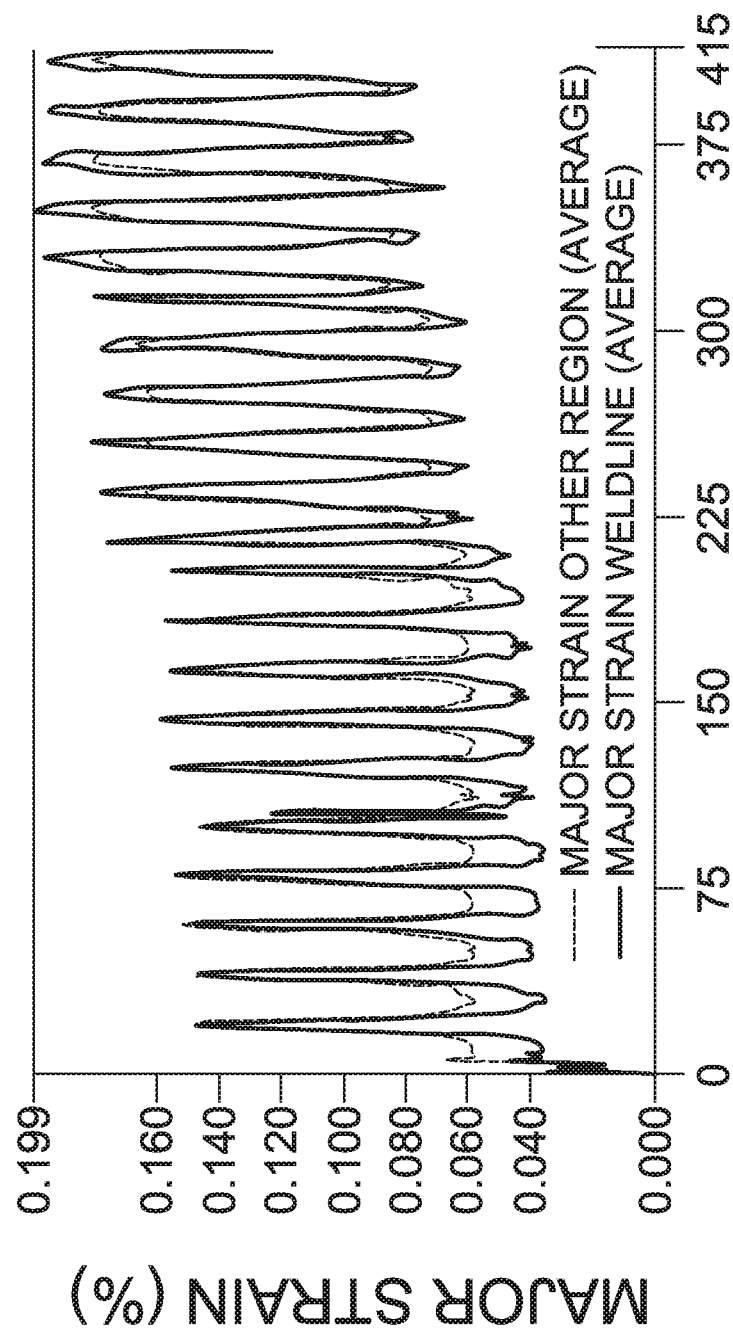
FIG. 11 shows a strain evolution over the lifetime of a specimen compared between weldline and non-weldline regions.

Specimens having weldline (i.e. to side-gated) were also used. The experiments were performed not for all load cases, but for different pressure levels, keeping the temperature and R-ratio constant. The strain amplitude ($\Delta\varepsilon$) was analyzed both locally on the weldline and on the regions without weldline. A clear local stiffness effect on the weldline is seen in FIG. 11. The orientation of fibers along the weldline revealed higher deformation compared to the non-weldline regions.

For fatigue evaluation, the local surface strain observed on the weldline was used. This is due to the fact that all the samples failed on the weldline region and that was exactly where the strain field was measured using the DIC system. The failures were mostly pin-point/brittle failures from the weldline.

Once the model is analyzed between ($\Delta \in \times \Delta \sigma$) and cycles to failure Nf, (FIGS. 12A and 12B), the surface strain energy density $\Delta W_s$ can now be calculated according to Eqn. (2) with material constant factors or directly from the area calculation as in FIGS. 9-10. Either cases are validated and studied detailed which is out of focus of this paper. The factor of $1/10$ was established between ($\Delta \in \times \Delta \sigma$) and $\Delta W_s$ was found from the direct hysteresis area calculation. Prior to area calculations, differentiation of LCF and HCF should be made ($\Delta W_{SE}$ or $\Delta W_{SL}$) can now be treated as one single term, $\Delta W_S$. A complete detailed fatigue model from the area calculation, $\Delta W_s$ can be seen in FIGS. 13A and 13B.

These fatigue models based on strain energy density can be also imported to finite element (FE) software for the numerical calculation. Together with damage accumulation theory using fatigue analysis software, lifetime can be also virtually predicted.

Figure 13A:
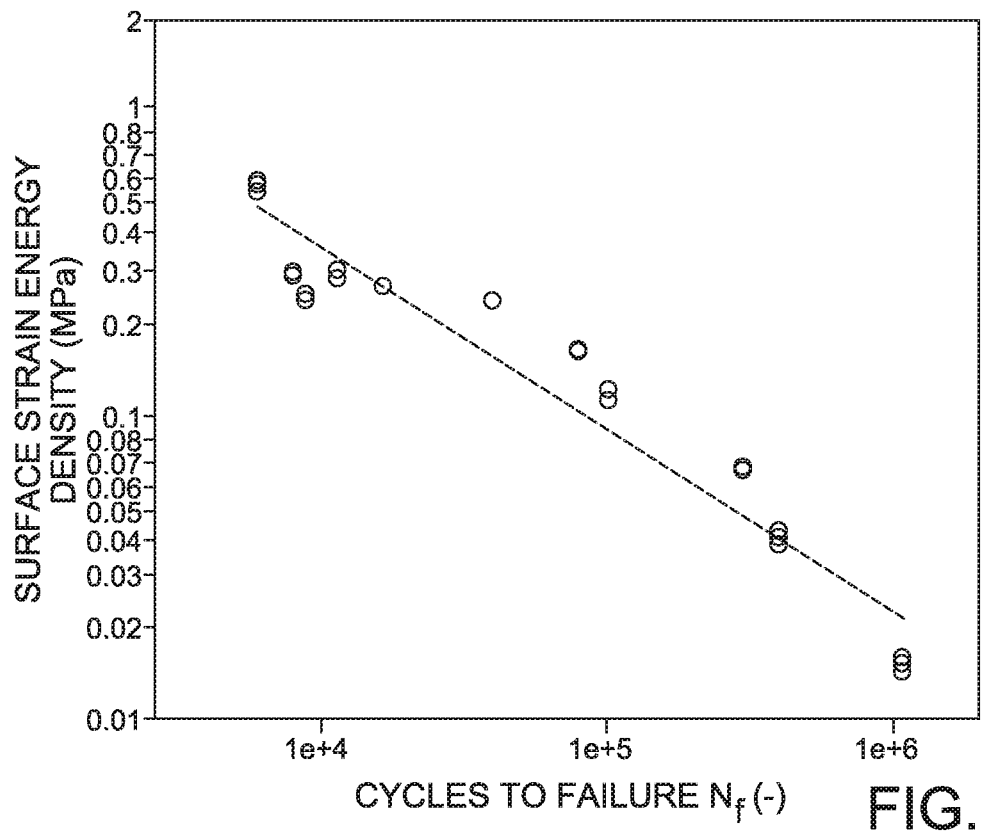
Figure 13B:
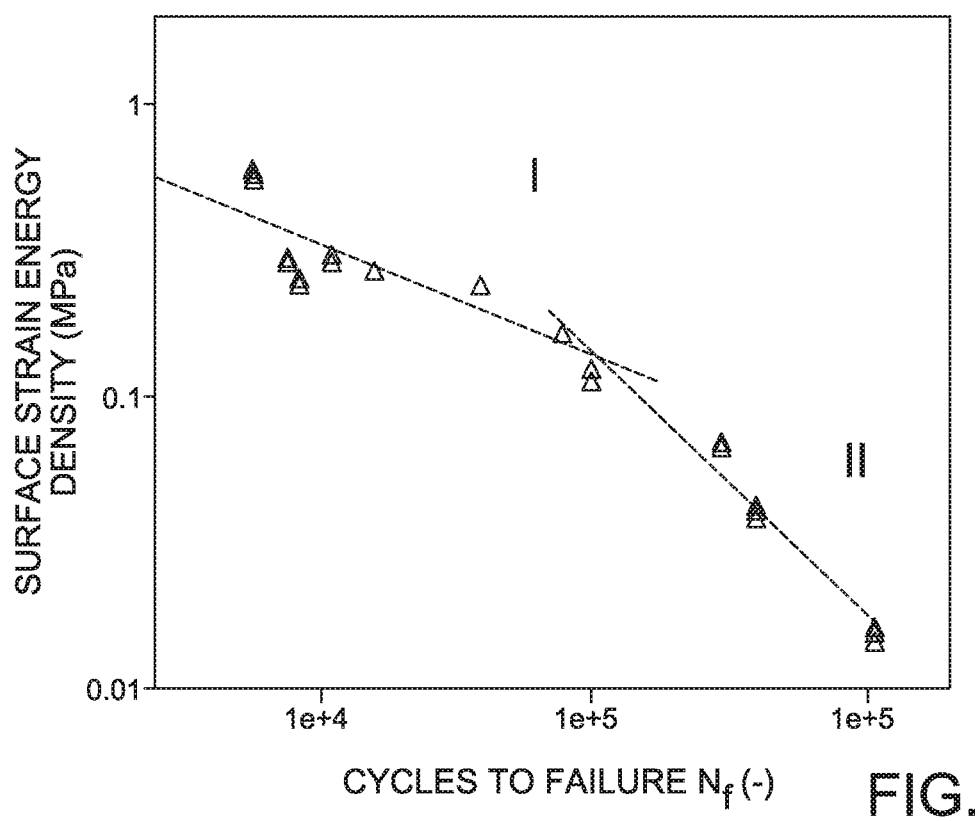

Linear regression analysis was performed on the observed data points from all the experiments. A single power law based on Morrow model as seen in FIG. 13A, from regression was analyzed. This single model accompanied all variable parameters of the experiment with R-squared value reaching up to 0.93. Double power law based on modified $\Delta W$-Nf, was investigated to bring in the possible slope shift effects for region I and II in FIG. 13B. In the field of pressurized pipes, efforts were made in past to understand distinct region with different failure process. Double power law had R-square values around 0.97.

TABLE 1

Fatigue model parameters, acc. to Equation. (3)

| | m | C [megapascals MPa] |
|---|---|---|
| Single power law | m = 0.6 | 4.47 |
| Double power law (I & II) | $m_1$ = 0.37; $m_2$ = 0.9 | $C_1$ = 2.33; $C_2$ = 8.41 |

The aforesaid approach remains valid as long as the cyclic effects such as cyclic hardening/softening are minimal. In case the cyclic effects are higher, the strain amplitude values will results in higher scatter. Another constraint of using the SSED is that the approach is based on the strain measurement on the outer surface; therefore thick walled applications need assumption of constant deformation over thickness.

A novel accelerated test technique for fatigue evaluation based on digital image correlation (DIC) was discussed. The fatigue model revealed a linear relationship with respect to the time of failure. As consequence generalized models were established based on it and all variable parameters like temperature, R-ratio, fiber orientation, pressure levels was collapsed onto a single or double power law. This rapid test technique will help in a faster application development process, enabling industries for a relative reduced lead time and faster time to market.

The methodology can potentially also be translated more generally to other situations where weld-lines are encountered although further appropriate validation is encouraged. Local deformation due to fiber orientation on weld-line effect can be captured successfully on to the fatigue model evaluation by this approach. The methodology being validated for element level in water management applications, can now translated more generally to structural application with continuous fibres like composites or any other reinforcement solutions. Translation to any polymer, metals, and ceramics may be possible.

Using the systems and methods of the present disclosure, fatigue models based on synchronized stress-strain field may be obtained. These fatigue models may form a linear trend irrespective of the loading conditions of the underlying test. Such evaluation may be translated to a standard method of fatigue testing, for example, SN, strain-life EN, standard tensile fatigue, and the like, thereby saving cost/time/resource associated.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

What is claimed is:

1. A method for material lifetime evaluation, the method comprising:
   causing a stress to be applied to a material surface of a component based at least on a cycle of load properties over time;
   causing an image of the material surface to be captured as a captured image of a complete in-situ field, wherein the captured image is correlated to the cycle of load properties, wherein the captured image is correlated with the cycle of load properties using digital image correlation (DIC) and wherein the captured image is correlated to surface strain of the component;
   determining an area of a hysteresis of a stable surface strain region in a stress-strain curve of the material surface to determine a loss energy for low cycle fatigue modeling, wherein the loss energy is a first damage parameter;
   determining a deformation energy for high cycle fatigue monitoring, wherein the deformation energy is a second damage parameter;
   determining a failure parameter based on at least one of the first damage parameter and the second damage parameter;
   comparing the failure parameter to a record in a database; and
   determining a remaining life of the component based on comparison of the failure parameter to the record in the database.

2. The method of claim 1, further comprising determining a lifetime parameter associated with the material surface, wherein the remaining life is based at least on the lifetime parameter.

3. The method of claim 1, wherein causing the stress to be applied to the material surface comprises applying forces to the material surface using a loading apparatus.

4. The method of claim 1, wherein the cycle of load properties comprises a load by generated by a change in temperature, a change in pressure, a change in mechanical force, a change in displacement, or a combination thereof.

5. The method of claim 1, wherein the material surface comprises a hotspot region.

6. The method of claim 1, wherein the captured image is synchronized with the cycle of load properties.

7. The method of claim 1, wherein causing the stress to be applied to the material surface is implemented using a loading apparatus.

8. The method of claim 1, wherein causing the image of the material surface to be captured comprises causing a series of images of the material surface to be captured.

9. A system for material evaluation, the system comprising:
   a load generator configured to apply a stress to a material surface of a component based at least on a cycle of load properties over time;
   a sensor configured to capture an image of the material surface as a captured image of a complete in-situ field, wherein the captured image is correlated to the cycle of load properties using digital image correlation (DIC), wherein the captured image is correlated to surface strain of the component; and
   a processor configured to:
   determine an area of a hysteresis of a stable surface strain region in a stress-strain curve of the material surface to determine a loss energy for low cycle fatigue modeling, wherein the loss energy is a first damage parameter,
   determine a deformation energy for high cycle fatigue monitoring, wherein the deformation energy is a second damage parameter,
   determine a failure parameter based on at least one of the first damage parameter and the second damage parameter,
   compare the failure parameter to a record in a database, and
   determine a remaining life of the component based on comparison of the failure parameter to the record in the database.

10. The system of claim 9, wherein the processor is further configured to determine a lifetime parameter associated with the material surface, wherein the remaining life is based at least on the lifetime parameter.

11. The system of claim 9, wherein the load generator applies a stress to the material surface using any loading apparatus.

12. The system of claim 9, wherein the cycle of load properties comprises a load generated by a change in temperature, a change in pressure, a change in mechanical force, a change in displacement, or a combination thereof.

13. The system of claim 9, wherein the material surface comprises a hotspot region.

14. The system of claim 9, wherein the captured image is synchronized with the cycle of load properties.

15. The system of claim 9, wherein the load generator comprises a loading apparatus.

16. A method for material evaluation, the method comprising:
    causing a stress to be applied to a material surface of a component based at least on a cycle of load properties over time;
    causing a first image of a first portion of the material surface to be captured as a captured first image, wherein the captured first image is correlated to the cycle of load properties;
    causing a second image of a second portion of the material surface to be captured as a captured second image, wherein the captured second image is correlated to the cycle of load properties using digital image correlation (DIC), wherein the first image and the second image are correlated to surface strain of the component, and wherein the first image and the second image comprise at least a portion of a complete in-situ field captured during the method; and
    determining an area of a hysteresis of a stable surface strain region in a stress-strain curve of the material surface to determine a loss energy for low cycle fatigue modeling, wherein the loss energy is a first damage parameter;
    determining a deformation energy for high cycle fatigue monitoring, wherein the deformation energy is a second damage parameter;
    determining a failure parameter based on at least one of the first damage parameter and the second damage parameter;
    comparing the failure parameter to a record in a database; and
    determining a remaining life of the component based on comparison of the failure parameter to the record in the database.

17. The method of claim 16, further comprising determining a lifetime parameter associated with the material surface, wherein the remaining life is based at least on the lifetime parameter.

* * * * *